United States Patent [19]

Yamada et al.

[11] Patent Number: 4,939,223

[45] Date of Patent: Jul. 3, 1990

[54] SILICON-MODIFIED POLYIMIDES

[75] Inventors: Yasuharu Yamada; Nobuyuki Furukawa, both of Kitakyushu, Japan

[73] Assignee: Nippon Steel Chemical Co., Ltd., Tokyo, Japan

[21] Appl. No.: 253,534

[22] Filed: Oct. 5, 1988

[51] Int. Cl.$^5$ .............................................. C08G 77/04
[52] U.S. Cl. ......................................... 528/28; 528/41
[58] Field of Search ..................................... 528/41, 28

[56] References Cited

U.S. PATENT DOCUMENTS

| | | | |
|---|---|---|---|
| 3,325,450 | 6/1967 | Holub | 528/21 |
| 3,987,003 | 10/1976 | Loughran et al. | 260/33.4 |
| 4,558,110 | 12/1985 | Lee | 528/26 |
| 4,672,099 | 6/1987 | Kunimune et al. | 525/431 |
| 4,818,806 | 4/1989 | Kunimune et al. | 525/431 |

FOREIGN PATENT DOCUMENTS

| | | |
|---|---|---|
| 57-143327 | 9/1982 | Japan . |
| 54-43026 | 3/1984 | Japan . |
| 60-17660 | 1/1985 | Japan . |
| 61-159425 | 7/1986 | Japan . |
| 63-23928 | 2/1988 | Japan . |
| 63-77936 | 4/1988 | Japan . |
| 63-77937 | 4/1988 | Japan . |
| 63-101423 | 5/1988 | Japan . |
| 63-110219 | 5/1988 | Japan . |

*Primary Examiner*—Melvyn Marquis
*Attorney, Agent, or Firm*—Armstrong, Nikaido, Marmelstein, Kubovcik & Murray

[57] ABSTRACT

Silicon-modified polyimides of this invention containing a basic structure of the general formula (1)

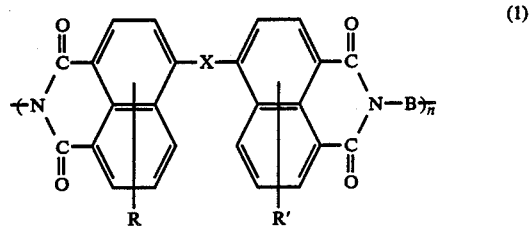

in which R and R' are hydrogen or alkyl, B is the amineless residue of a diamine, and X is divalent radical

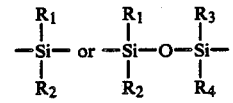

in which $R_1$ to $R_4$ are monovalent hydrocarbon groups with 1 to 6 carbon atoms show excellent heat resistance and solubility in various solvents and are useful for films for orientation of LCD's, junction coating resins for diodes, passivation films for IC's and LSI's, and alpha ray shielding films for VLSI's.

4 Claims, No Drawings

SILICON-MODIFIED POLYIMIDES

FIELD OF THE INVENTION AND RELATED ART STATEMENT

This invention relates to silicon-modified polyimides of a novel structure.

Polyimides are generally characterized by excellent resistance to heat and chemicals and excellent mechanical and electrical properties, and silicon- or siloxane-modified polyimides, because of the presence of silicon in the polymers, are expected to show good adhesion to a variety of silicon-containing materials and may be useful for protective materials and the like in the manufacture of semiconductors.

Accordingly, silicon- or siloxane-modified polyimides have been proposed; for example, U.S. Pat. Nos. 3,325,450 and 4,558,110 and Japanese Kokai Tokkyo Koho Nos. 43,026-1984, 17,660-1985, 143,327-1982, 159,425-1986, 23,928-1988, 77,937-1988 and No. 77,936-1988 etc. The Japanese Kokai Tokkyo Koho No. 43,026-1984 discloses a method of making silicon-modified polyimides by heating a mixture of tetracarboxylic acid dianhydrides mainly consisting of 3,3′,4,4′-biphenyltetracarboxylic acid dianhydride and/or 3,3′,4,4′-benzophenonetetracarboxylic acid dianhydride, aromatic diamines, and silicon-containing diamines whereby the dehydrating polycondensation is effected by amidation followed by imidization with the accompanying removal of the by-product water from the reaction system.

The modification of polyimides with such silicon-containing diamines, however, presents a problem of the heat resistance of the modified polyimides decreasing with the increasing content of the silicon-containing diamines.

Further, polyimides with a naphthalene-skeleton have been proposed; for example, U.S. Pat. No. 3,987,003 and Japanese Kokai Tokkyo Koho No. 101,423-1988 and No. 110,219-1988 etc.

OBJECT AND SUMMARY OF THE INVENTION

An object of this invention is to provide novel silicon-modified polyimides.

Another object of this invention is to provide silicon-modified polyimides of excellent heat resistance in spite of a high silicon content.

Still another object of this invention is to provide silicon-modified polyimides which are soluble in phenolic solvents such as m-cresol and in aprotic polar solvents such as N-methyl-2-pyrrolidone.

A further object of this invention is to provide novel silicon-modified polyimides which possess excellent heat resistance even at a high silicon content, show good solubility in phenolic solvents such as m-cresol and in aprotic polar solvents such as N-methyl-2-pyrrolidone, and are useful for the manufacture of organic oriented films for LCD's, junction coating resins for diodes, passivation films for IC's and LSI's, and alpha ray shielding films for VLSI's.

Thus, this invention provides silicon-modified polyimides having a basic structure of the general formula (1)

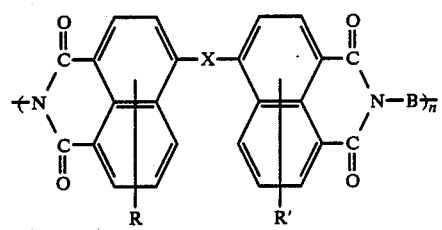

in which R and R' are hydrogen or alkyl, B is the amineless residue of a diamine n is the polymerization number, and X is a divalent radical

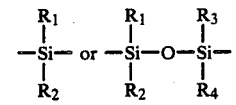

in which $R_1$ to $R_4$ are monovalent hydrocarbon groups with 1 to 6 carbon atoms.

In the silicon-modified polyimides of this invention, the monovalent hydrocarbon groups $R_1$ to $R_4$ are preferably alkyl groups with 1 to 6 carbon atoms include methyl, ethyl, n-propyl, isopropyl, n-butyl, isobutyl, sec- butyl, tert-butyl, cyclopentyl, and cyclohexyl.

The radical B represents the amineless residues of the diamines publicly known in the manufacture of polyimides and includes phenylene, substituted phenylene, biphenylene, substituted biphenylene, naphthylene, substituted naphthylene, and

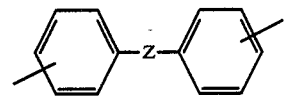

(Z us —CH$_2$—, —O—, —S—, or —SO$_2$—) and the amineless residues of silicon-containing diamines of the general formula

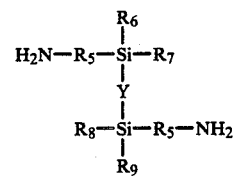

in which $R_5$ is alkylene with 1 to 4 carbon atoms, phenylene, or substituted phenylene, $R_6$ to $R_9$ are alkyl, phenyl, or substituted phenyl, and Y is oxygen, phenylene, or substituted phenylene.

Typical examples of such silicon-modified polyimides are those polyimides which are entirely composed of the structure of the general formula (1) with B representing phenylene, naphthylene,

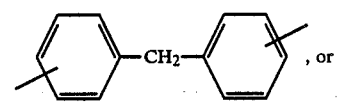

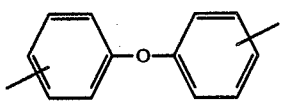

and X is —Si(CH$_3$)$_2$—. Such silicon-modified polyimides exhibit excellent heat resistance in spite of high silicon contents and are readily soluble in phenolic solvents such as m-cresol and in aprotic polar solvents such as N-methyl-2-pyrrolidone.

The silicon-modified polyimides of this invention may be prepared by the reaction of tetracarboxylic acid dianhydrides of the general formula (2)

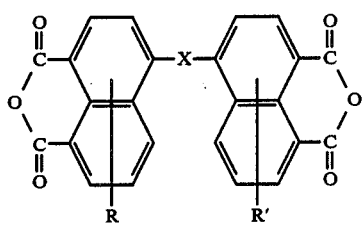

in which R, R', and X are the same as in the general formula (1) with diamines of the general formula H$_2$N-B-NA$_2$ in which B is the same as in the general formula (1).

According to this invention, the tetracarboxylic acid dianhydrides to be used in the preparation of the silicon-modified polyimides of the general formula (1) may be those of the general formula (2), used alone or in admixture with other tetracarboxylic acid dianhydrides if necessary. Such other dianhydrides may be any of those used in the manufacture of polyimides of this kind and preferred examples include 4,4',5,5'-dinaphthalenetetracarboxylic acid dianhydride, 1,4,5,8-naphthalenetetracarboxylic acid dianhydride, and pyromellitic dianhydride. As a consequence, the amount of the tetracarboxylic acid dianhydrides of the general formula (2) may be varied depending upon the end use of the silicon-modified polyimides to be prepared, and it is normally 10 mol % or more, preferably 50 mol % or more, of the tetracarboxylic acid dianhydride components. Namely, a ratio of the structure of the general formula (1) in the silicon-modified polyimides of the present invention is normally 10 mol % or more, preferably 50 mol % or more.

The preparation of the tetracarboxylic acid dianhydrides of the general formula (2) is explained with reference to bis(4,5-dicarboxynaphthyl)dimethylsilane dianhydride starting from acenaphthene.

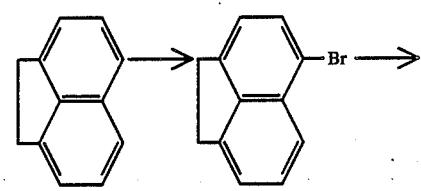

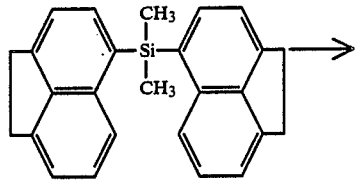

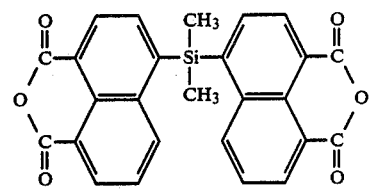

Acenaphthene is brominated at the 4-position to give 4-bromoacenaphthene by one of the known methods; for example, N-bromophthalimide (NBS) as brominating agent is added in portions to a dispension of acenaphthene in dimethylformamide as described by R. H. Mitchell, et al. in J. Org. Chem., 44, No. 25, p 4,733 (1979).

The 4-bromoacenaphthene is then treated with dimethyldichlorosilane to give diacenaphthyldimethylsilane. This reaction is carried out by preparing a Grignard reagent from the aforesaid 4-bromoacenaphthene and metallic magnesium and treating the Grignard reagent with dimethyldichlorosilane or by preparing 4-lithioacenaphthene from acenaphthene and n-butyllithium and treating the 4-lithioacenaphthene with dimethyldichlorosilane [cf: J. Org. Chem., Vol. 38, No. 25, p. 4,271~4,274 (1973)].

The diacenaphthyldimethylsilane thus prepared is oxidized with an oxidizing agent such as sodium dichromate in a solvent such as acetic anhydride. The oxidation reaction accompanied by the dehydration reaction takes place and the desired dianhydride is directly obtained without isolation of bis(4,5-dicarboxynaphthyl)dimethylsilane.

Examples of the tetracarboxylic acid dianhydrides prepared in this manner include bis(4,5-dicarboxynaphthyl)dialkylsilane dianhydrides such as bis(4,5-dicarboxylnaphthyl)dimethylsilane dianhydride and bis(4,5-dicarboxynaphthyl)diethylsilane dianhydride and 1,3-bis(4,5-dicarboxynaphthyl)-1,1,3,3-tetraalkyldisiloxane dianhydrides such as 1,3-bis(4,5-dicarboxynaphthyl)-1,1,3,3-tetramethyldisiloxane dianhydride and 1,3-bis(4,5-dicarboxynaphthyl)-1,1,3,3-tetraethyldisiloxane dianhydride.

The diamines to be used in the manufacture of the silicon-modified polyimides of this invention may be any of the known aromatic diamines and silicon-containing diamines used for the manufacture of polyimides of this kind and preferred examples include 4,4'-diaminodiphenylmethane, 4,4'-diaminodiphenyl ether, 2,2'-bis(4-aminophenyl)propane, 3,3'-diaminodiphenyl sulfone, 4,4'-diaminodiphenyl sulfide, p-phenylenediamine, m-phenylenediamine, benzidine, 3,3'-dimethylbenzidine, 3,3'-dimethoxybenzidine, and 1,6-diaminonaphthalene.

The preparation of the silicon-modified polyimides of this invention from the aforesaid tetracarboxylic acid dianhydrides and diamines can be effected by any of the methods known for the preparation of polyimides. For example, precursor polyamic acids are prepared and imidized under heat or the dehydrating polycondensation is effected by the amidation in a solvent such as m-cresol under heat followed by the imidization with the attendant removal of the by-product water from the reaction system.

The silicon-modified polyimides of this invention contain six-membered imide rings and have higher thermal stability.

DETAILED DESCRIPTION OF THE PREFERRED EMBODIMENT

This invention is explained with reference to the accompanying examples.

EXAMPLES 1-5

In 5g of m-cresol was dissolved 1.1 millimole of each of the aromatic diamines shown in Table 1: 4,4'-diaminodiphenyl ether (DADPE), 4,4'-diaminodiphenylmethane (DADPM), 1,4-diaminobenzene (DAB), 1,8-diaminonaphthalene (DAN), and bis(4-aminophenyl) sulfone (BAS). To this solution was added 1.1 millimole of bis(4,5-dicarboxynaphthyl)dimethylsilane dianhydride in small portion at room temperature and the mixture, upon completion of the addition, was heated to 180° C. over approximately 30 minutes with the passage of a stream of nitrogen through the reaction system, and the reaction was continued at this temperature for 10 hours. The mixture turned into a brown homogeneous solution at about 120° C. in the course of the reaction.

Upon completion of the reaction, the viscous reaction mixture was added dropwise to 250 ml of methanol, the solids were collected by filtration, washed twice with 100 ml of methanol, dired at 100° C. under reduced pressure for 2 hours, and then dried at 200° C. for 1 hour in an atmosphere of nitrogen to obtain the intended silicon-modified polyimide.

The polyimides prepared in Examples 1-5 were tested for their solubility in m-cresol (m-Cr) and N-methyl-2-pyrrolidone (NMP) (O, readily soluble; Δ, soluble; X, insoluble), the temperature for 5% weight loss by thermogravimetry, and their intrinsic viscosity [η sp/C, calculated as In $(\eta/\eta_0)/C$] in N-methyl-2-pyrrolidone at 30° C. and 5 g/100 ml concentration. The results are shown in Table 1.

TABLE 1

| Example No. | 1 | 2 | 3 | 4 | 5 |
|---|---|---|---|---|---|
| Kind of Aromatic Diamine | DAD-PE | DAD-PM | DAB | DAN | BAS |
| Solubility in solvent | | | | | |
| m-Cr | o | o | o | o | o |
| NMP | o | Δ | x | o | Δ |
| 5% Weight loss Temperature (°C.) | 430 | 461 | 455 | 475 | 450 |
| Intrinsic Viscosity | 0.24 | 0.14 | 0.10 | 0.14 | 0.20 |
| Si Content (%) | 4.55 | 4.56 | 5.34 | 4.88 | 4.22 |

In addition, the infrared absorption spectra were observed for the samples as shown in Table 2.

TABLE 2

| Infrared absorption (cm$^{-1}$) | | | | |
|---|---|---|---|---|
| Example 1 | 1710, | 1670, | 1585, | 1500 |
| 2 | 1720, | 1675, | 1585, | 1510 |
| 3 | 1720, | 1675, | 1590, | 1515 |
| 4 | 1715, | 1675, | 1585, | 1510 |
| 5 | 1720, | 1675, | 1590, | 1510 |

EXAMPLE 6

Following the procedure of Example 1, 2.0 g (0.01 mol) of 4,4'-diaminodiphenylether was dissolved in 50 g of N-methyl-2-pyrrolidone. Then 5.26 g (0.01 mol) of 1,3-bis(4,5-dicarboxinaphthyl)-1,1,3,3-tetramethyldisiloxane dianhydride was added to the solution and stirring was continued until a homogeneus viscous fluid was obtained.

Then, 5 ml of toluene was added to the obtained homogeneus fluid, and the mixture was heated to 180° C. under toluene azeotropic distillation in conditions to obtain the intended siloxane-modified polyimide through a dehydrating ring closure reaction.

The obtained polyimide is soluble in N-methyl-2-pyrrolydone, m-cresol and chloroform, and the temperature for 5% weight loss thereof is 350° C.

What is claimed is:

1. A silicon-modified polyimide comprising a structure of the formula (1)

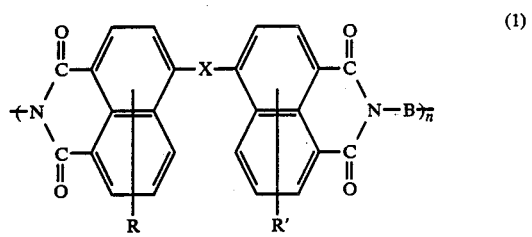

in which R and R$^1$ are hydrogen or alkyl, B is phenylene, substituted phenylene, biphenylene, substituted biphenylene, naphthylene, substituted naphthylene or

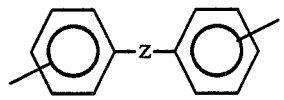

wherein Z is selected from —CH$_2$, —O—, —S—, or SO$_2$, n is the polymerization number, and X is a divalent radical

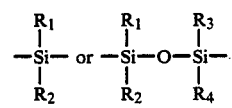

in which R$^1$ to R$_4$ are monovalent hydrocarbon groups with 1-6 carbon atoms.

2. The silicon-modified polyimide according to claim 1 wherein the divalent radical X in the general formula (1) is

in which $R_1$ and $R_2$ are alkyl with 1 to 6 carbon atoms.

3. The silicon-modified polyimide according to claim 1 wherein the divalent radical X in the general formula (1) is

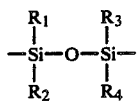

in which $R_1$ to $R_4$ are alkyl with 1 to 6 carbon atoms.

4. The silicon-modified polyimide according to claim 1 wherein said polyimide is obtained by reacting an aromatic diamine containing phenylene, substituted phenylene, biphenylene, substituted biphenylene, naphthylene, substituted naphthylene, or

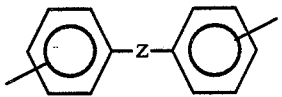

wherein Z is a member selected from the group of —$CH_2$—, —O—, —S—, or —$SO_2$, with at least 50 mole percent of a tetracarboxylic dianhydride of the formula:

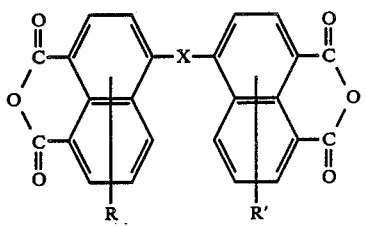

(2)

wherein X, R and $R^1$ have the same meaning as in formula (1).

* * * * *

UNITED STATES PATENT AND TRADEMARK OFFICE
CERTIFICATE OF CORRECTION

PATENT NO. : 4,939,223

DATED : July 3, 1990

INVENTOR(S) : YAMADA et al

It is certified that error appears in the above-identified patent and that said Letters Patent is hereby corrected as shown below:

Column 6, lines 54 and 55, " $-CH_2$, $-O-$, $-S-$, or $SO_2$, " should read -- $-CH_2-$, $-O-$, $-S-$, or $-SO_2-$, --.

Column 8, line 8, " $-SO_2$, " should read -- $-SO_2-$, --.

Signed and Sealed this

First Day of October, 1991

Attest:

HARRY F. MANBECK, JR.

Attesting Officer

Commissioner of Patents and Trademarks